Oct. 31, 1950     F. L. MALTBY     2,528,377
CONSTANT VOLTAGE THERMOELECTRIC GENERATING APPARATUS
Filed Dec. 17, 1948

INVENTOR.
Frederick L. Maltby
BY
E.C. Sanborn
Attorney

Patented Oct. 31, 1950

2,528,377

UNITED STATES PATENT OFFICE 2,528,377

CONSTANT VOLTAGE THERMOELECTRIC GENERATING APPARATUS

Frederick L. Maltby, Naugatuck, Conn., assignor to The Bristol Company, Waterbury, Conn., a corporation of Connecticut Application December 17, 1948, Serial No. 65,871

14 Claims. (Cl. 322—2)

This invention relates to a source of constant-potential electrical energy, and more especially to a thermoelectric generating apparatus from which may be derived a constant unidirectional potential adapted to the energization of a potentiometer slide-wire, or to the maintenance of a predetermined constant voltage between points in a thermionic system, or to other purposes where there may be required a direct potential of closely regulated constancy.

In the precise measurement of unidirectional electric potentials, and in control practices based on the maintenance of such potentials at predetermined and constant values wide use is made of null methods, wherein a potential whose magnitude is to be determined or controlled is caused to be opposed by the fall of potential across a portion of resistance commonly in the form of a slide-wire through which is flowing a steady current of predetermined value. The difference between the measured potential and the utilized portion of the gradient along the slide-wire may be reduced to a zero value either by adjustment of the point of connection on the slide-wire or by regulation of the source responsible for the measured potential. This principle, generally classified under the name of "Potentiometric" is well known in the art of electrical measurement and control; and instruments embodying the principle may be obtained in a wide variety of types and forms.

As is well known in the practice of electronics there are many instances where it is desirable that a predetermined constant potential be maintained between vacuum tube electrodes, or between other points in a network embodying electronic tubes, and that satisfactory performance of the apparatus is directly dependent upon the constancy of this potential. Again, in certain devices involving electromagnetic principles, especially those utilizing the non-linear characteristics of ferromagnetic materials, it is frequently desirable that a magnetic circuit, or a portion thereof, be subjected to a constant bias, similar to that which might be derived from a permanent magnet. In all the above-enumerated conditions it is highly desirable that the potential applied between selected points in a circuit be of an intensity unvarying over extended periods of time, and over a wide variety of conditions.

It is an object of the present invention to provide means from which may be derived an electrical potential of magnitude and constancy adapted to its use in measuring or controlling systems of the class described.

It is a further object to provide means of the above nature which shall be adapted to operation from an ordinary supply of electric energy in the voltage and frequency ranges commonly found in commercial installations.

It is a further object to provide means of the above nature wherein the constancy of the developed potential shall be unaffected by changes in the magnitude of the supply voltage or in surrounding conditions.

It is a further object to provide means of the above nature, in which the design shall not be unduly circumscribed in a limited selection of available materials.

It is a further object to provide means of the above nature which shall be compact in structure, inexpensive to construct and maintain, and readily adaptable to incorporation in measuring and controlling instruments.

In carrying out the purposes of the invention it is proposed to provide a generator in the form of a thermoelectric battery wherein opposed junctions are maintained at a predetermined temperature difference, and wherein the magnitude of said temperature difference may be automatically compensated for changes in uncontrollable variables, whereby to maintain constant the output of said thermoelectric system.

Figure 1:
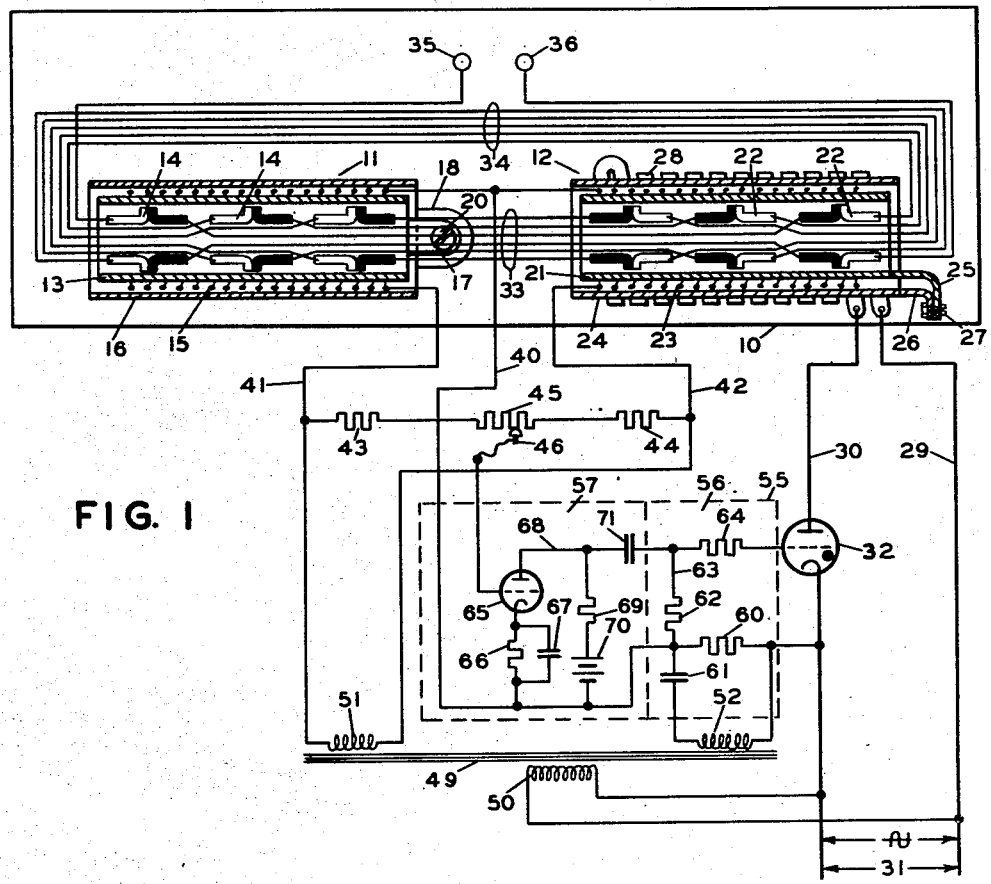
Fig. 1 is a diagrammatic representation partly in section of a thermoelectric generator embodying the principles of the invention.

Referring, now, to the drawings:

Mounted upon a metallic base plate 10 are two thermal elements 11 and 12, combining thermocouples, temperature equalizers, temperature sensitive resistors, and heating means in a manner now to be described. Considering, for example, the element 11, a tubular member 13 of metal or other thermally conducting material is provided with a plurality of thermo-junctions 14 positioned interiorly thereof, electrically insulated therefrom, but in intimate thermal association with the interior wall of said tubular member. Wound upon the exterior surface of the tubular member 13, but electrically insulated therefrom, is a resistance element 15, formed of nickel or other material having an appreciable and predetermined temperature coefficient of resistivity. The resistor 15 is made in the form of a bifilar winding or is otherwise rendered substantially non-inductive. Surrounding the tubular member 13 and the resistor 15 carried thereby is a further tubular member 16 formed of thermally conducting material, electrically insulated from the winding 15 and adapted to function in combination with the tubular member 13 in providing a uniform distribution of temperature throughout the element 11 and causing the resistor 15 to assume substantially the same mean temperature as that of the thermo-junctions 14. The tubular members 13 and 16 may be provided with thermally conducting lug portions 17 and 18 respectively, adapted to be secured to each other and to the base plate 10 by means of a screw 20, whereby to promote equalization of temperature between said tubular members and to maintain the same at substantially the temperature of the base plate 10.

The thermal element 12 comprises an inner tubular member 21 of metal or other thermally conducting material, having therein a group of thermo-junctions 22 identical in material, structure, and distribution, to the junctions 14 within the tubular element 13. The tubular member 21 carries a temperature sensitive resistance winding 23, electrically insulated from said member and identical with the resistor 15, said winding 23 being surrounded by and electrically insulated from a further tubular member 24 of thermally conducting material, whereby the thermo elements 11 and 12 will be as nearly as possible identical in all thermal characteristics. The tubular members 21 and 24 may be provided with thermally conducting lug portions 25 and 26 respectively thermally bonded to each other (but not to the mounting plate 10) as by a bolt 27, whereby to equalize the temperatures of said tubular members. In the interest of clarity, the means for mechanically mounting the thermal elements 11 and 12 upon the base plate 10 is omitted from the drawings. While the element 11 may be directly secured to said plate, as by the screw 20, and other fastening means if necessary, the element 12 must be thermally insulated therefrom in order that it may assume a relatively elevated temperature as hereinafter to be set forth.

Wound upon the exterior surface of the tubular member 24 and electrically insulated therefrom is an electrical resistor type of heating element 28, preferably non-inductive in its configuration and having its terminals connected to conductors 29 and 30. The former of said conductors leads directly to one side of an alternating-current power source 31, and the latter to the anode of a grid-controlled gas-filled triode 32, whose cathode, in turn, is connected to the other side of said power source. Thus the supply of current to the heating element 28 may be made subject to the potential of the control electrode of said triode, as will presently be described.

Designating the shaded elements of the thermo-junctions 14 and 22 as shown in the drawings as *positive*, and the unshaded elements as *negative*, the positive elements of the junctions 14 are respectively connected by means of a group of conductors 33 to the positive elements of the junctions 22; and the negative elements of said junctions are similarly interconnected by means of a group of conductors 34, the connections being made such that the thermocouples comprised of the two sets of junctions will all be connected in a single series circuit, whereby to comprise a thermoelectric generator having two terminals which may be connected to binding posts 35 and 36 insulatedly mounted on the plate 10. The symmetry of the apparatus as thus far described is made such that if the thermal elements 11 and 12 have equal mean temperatures, the thermoelectromotive forces set up in the several thermocouples will mutually neutralize, and the potential between the binding posts 35 and 36 will have a zero value. If, on the other hand, the mean temperature of one of said thermal elements be higher than that of the other, the thermoelectromotive forces will no longer be balanced and the resultant potential difference will appear between the binding posts 35 and 36, this potential difference being proportional to the temperature gradient existing between the thermal elements 11 and 12. An important feature of the invention involves maintaining between the thermal elements 11 and 12 a constant and predetermined temperature difference, this being effected by means now to be set forth.

One end of each of the temperature sensitive resistance elements 15 and 23 is connected to a common conductor 40, and the free ends of said resistors to separate conductors 41 and 42 to which, in turn, are respectively connected one end each of two non-inductive fixed resistors 43 and 44, having values substantially equal to, or slightly less than, the nominal values of the resistors 15 and 23. The free terminals of the resistors 43 and 44 are connected to the terminals of a substantially non-inductive voltage-dividing resistor 45 having an adjustable tap 46 whereby the values of resistance between said tap and the conductors 41 and 42 may be made equal, or proportional, to the values of the resistors 15 and 23.

A transformer 49 is provided with a primary winding 50 adapted to be energized from the alternating current source 31, and with two secondary windings 51 and 52, the former of which is connected to the conductors 41 and 42 whereby to energize the network comprising the resistance elements 15, 23, 43, 44 and 45. It will be seen that the said network constitutes a bridge circuit and that by suitably positioning the adjustable tap 46 with respect to the resistor 45 said bridge may be balanced, whereby the alternating electric potential between the conductor 40 and the tap 46 may be reduced to a zero value.

In order that the current flowing in the heater 28 be automatically regulated to a suitable magnitude, the potential of the control grid of the gas-filled triode 32 with respect to its cathode is subjected to a phase-shifting influence, whereby, in accordance with the well-known principles of such tubes, the average value of the output current may be made a function of the phase relationship existing between the grid and plate potentials respectively in relation to that of the cathode. The grid potential is made up of two alternating components, one substantially in quadrature with the plate potential and of constant value, and one substantially in phase with the plate potential and varying with the potential between the conductor 40 and the resistance tap 46. For purposes of clarity in the diagram of Fig. 1, the control grid potential source for the triode 32 is represented as enclosed in a broken-line rectangle 55, divided, in turn, into two portions, a quadrature potential source 56 and an in-phase source 57.

The quadrature potential source comprises a resistor 60 connected in series with a capacitor 61 across the terminals of the transformer secondary winding 52. One end of the resistor 60 is connected to the cathode of the gas-filled triode 32 and the other end to the conductor 40. Said last-named conductor is connected through a resistor 62 to a conductor 63, and thence through a protective resistor 64 to the control grid of the triode 32. The resistor 60 and the capacitor 61 are so proportioned with respect to each other and to other elements of the network as thus far described that, with said network energized solely from the transformer secondary 52, the grid potential of the tube 32 will be substantially in quadrature with the plate potential, whereby to render said tube conducting for approximately one-quarter of each cycle of the applied alternating potential.

The in-phase potential source 57 includes a triode 65, having its cathode connected to the conductor 40 in series with a resistor 66 and a paralleled A.-C. by-pass capacitor 67, and its anode or plate to a conductor 68 and thence through a series resistor 69 to the positive terminal of a battery 70, or equivalent source of direct current, the negative terminal of which is connected to the conductor 40. There is thus provided through said triode and associated elements a circuit for current from the source 70; and, by suitably inter-relating the values of the resistors 66 and 69 with respect to tube characteristics and to the potential of the source 70, the cathode may be given such a bias that, within selected limits of operation, a substantially linear relationship will exist between the control grid potential and the anode current. Thus, upon said potential having an alternating characteristic, there will flow in the output circuit of the tube 65 an alternating current having an intensity and phase-position directly dependent upon the magnitude and sense of unbalance of the temperature-sensitive bridge comprising the resistors 16, 23, etc., as hereinbefore set forth, said unbalance being represented by the potential existing between the conductor 40 and the tap 46. Since all elements of the temperature-sensitive bridge ar non-inductive, it follows that under no condition of unbalance will the potential between the conductor 40 and the tap 46 contain an appreciable quadrature component, whence any alternating current which may flow in the output circuit of the triode 65 will be either in phase (or 180° out of phase) with the terminal voltage of the transformer secondary 51 from which said bridge is energized.

The network constituting the in-phase potential source is coupled to that constituting the out-of-phase source through a suitable capacitor 71 connected between the conductors 68 and 63, whereby the alternating component only of the potential between the conductors 68 and 40 will be superposed upon the potential between conductors 63 and 40, to modify the potential impressed upon the control grid of the gas-filled tube 32 according to balance or unbalance conditions existing in the temperature sensitive bridge network.

As hereinbefore pointed out, the elements associated with the gas-filled triode 32 are so selected that, with no potential other than the quadrature voltage derived from the transformer secondary 52 applied to the control grid of said triode, the latter will be conducting for approximately one-quarter of each cycle of the applied alternating potential. This represents the intermediate operating condition for tubes of the gas-filled type; and the mean conductivity may be increased or decreased by shifting the phase position of the control potential with respect to the plate voltage of the tube. With the heating element 28 carrying current as limited by the condition of the triode 32, the temperature of the thermal elements 12 will tend to be maintained at a value materially higher than that of the thermal element 11, which has no direct means for increasing its temperatre above that of the surrounding atmosphere. The thermal element 11 being bonded to the conducting base portion 10 said element will tend to be maintained at a temperature only slightly above that of the surroundings. The thermal element 12, on the other hand, being thermally insulated from the base plate 10, will tend to assume a temperature uniform throughout its structure as facilitated by the bonding lugs 25 and 26 and the connecting bolt 27, but higher than that of the element 11. The element 12 will dissipate heat by radiation, convection, and such thermal conduction as may take place through the electrical conductors 33 and 34, tending to reduce the temperature difference between the thermocouples 22 and the thermocouples 14. Under any condition of current input to the heating element 28 there will, however, tend to be established a condition of thermal equilibrium, wherein the temperature gradient between the two sets of thermocouples 22 and 14 will assume constant value. Since each of the thermal elements 11 and 12 is constructed to have a substantially uniform temperature throughout its structure, it follows that the temperature-sensitive resistance elements 15 and 23 will also tend to assume a constant difference of temperature. By suitably adjusting the position of the sliding contact or tap 46 with respect to the resistor 45, the bridge circuit including the resistors 15, 23, 43 and 45 may be set at a balanced condition for any desired temperature difference between the resistors 15 and 23. Thus, to summarize: for any selected temperature difference between the elements 11 and 12, as established by current under control of the triode 32, the adjusting resistor 45 may be utilized to establish a condition of electrical balance wherein there will exist no potential between the tap 46 and the conductor 40, under which condition there will be impressed upon the control grid of the triode 32 no potential other than the quadrature voltage derived from the transformer secondary 52.

It has been shown that, for any selected temperature difference between the thermal elements 11 and 12, the bridge circuit associated with the thermally sensitive resistors 15 and 23 may be adjusted so that there will be no potential from source 57 superposed upon the quadrature potential developed in the source 56 and impressed upon the control grid of the triode 32. It may now be assumed that, following the establishment of such a condition, there occurs a change in the temperature difference between the thermal elements 11 and 12. This may be occasioned by a change in heat dissipating facilities of the thermal structure, or a variation in the supply voltage of the source 31, or some other cause. In any event, the temperature change will be reflected in a change in the difference of temperatures of the thermal elements 11 and 12 and hence of the temperature sensitive resistors 15 and 23. Thus the bridge network in which said resistors are incorporated will become unbalanced, with the result that an alternating potential will appear between the conductor 40 and the tap 46. This potential being impressed upon the electronic network constituting the source 57 will as hereinbefore pointed out cause an in-phase component of potential to be impressed upon the network constituting the source 56, combining with the quadrature component developed by said last named source to produce a phase shift in the grid potential of the gas-filled triode 32. According to the well known principles of such triodes, the change of phase position of the grid potential will produce a change in the mean conductivity of said triode whereby the average value of current flow in the heater 28 will be either increased or decreased from its former value. It will thus be apparent that by suitably selecting the characteristics of circuit components and the relative polarity of respective potentials the gas-filled tube 32 may be caused to act as a regulator, with a tendency to adjust the temperature of the thermal element 12 in such a manner as to maintain a predetermined temperature difference between the thermal elements 11 and 12 and thus to maintain a substantially constant thermoelectromotive force between the output terminals 35 and 36.

If the relationship existing between the temperature difference of two thermojunctions and the thermoelectromotive force generated in the circuit of which they form a part were always linear the only requisite to the development of a constant electromotive force would lie in the maintenance of a constant temperature difference between said junctions, irrespective of their actual operating temperatures. Since, however, the characteristic curve representing the E. M. F./temperature relationship of any couple is parabolic in its nature, with a consequent variation of slope at all points, it follows that, unless one of the junctions be maintained at a constant temperature, the electromotive force resulting from a constant temperature gradient between junctions will in general not be constant, but will vary with the actual operating temperatures of the combination. According to the nature of the materials of the thermocouple, the ratio of electromotive force to temperature difference may either increase, or decrease, with equal elevation of the operating temperatures of the junctions. Any combination of materials wherein the E. M. F./temperature-difference relation is constant over an appreciable range of operating temperature is special, but significant.

The thermoelectric power Q of a junction is given by the equation:

$$Q = A + Bt$$

where A is the thermoelectric power at a selected reference temperature (0° C.), and B is the coefficient of $t$ in the equation for the thermoelectric power at any temperature $t$.

The coefficient B is a characteristic of the thermoelectric combination used, and, if it is positive, the ratio of generated electromotive force to temperature difference rises with the operating temperatures, and vice versa. In order for the relationship between said ratio and said operating temperatures to be constant, the coefficient B must have a zero value; and any combination of thermocouple materials exhibiting this characteristic is significant, but special. An example of such a combination is found in a thermocouple composed of platinum in combination with an alloy of 90% nickel and 10% chromium. (Handbook of Chemistry & Physics, Chemical Rubber Pub. Co., 27th ed., page 1893.) In the interest of flexibility of design, and in order not to be unduly restricted in the choice of thermocouple materials, the present invention contemplates the provision of compensating means, whereby to offset the non-linear law characterizing most thermoelectric combinations.

Figure 2:
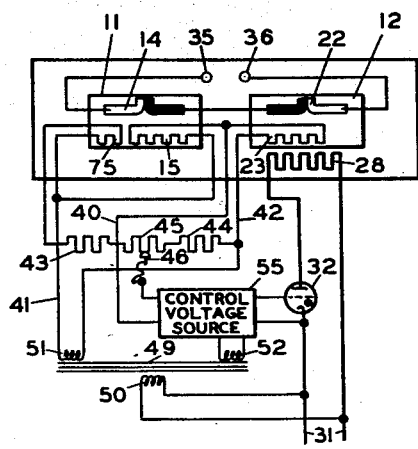
Figs. 2 and 3 show diagrammatically alternative forms which may be assumed by the electric circuits of the invention.

In order to provide a compensation for the non-linear characteristic of thermoelectric combinations, there is added to the network of the temperature sensitive bridge a further temperature sensitive resistance tending to superpose upon the bridge system an unbalance influence subject to the actual temperature of one of the thermal elements in the combination, without respect to the temperature gradient existing between said elements. In Fig. 2 is shown a combination adapted to compensation for the non-linear law characterizing thermocouples in which the co-efficient B in the above equation has a positive value. All elements of the structure and network shown in Fig. 2 are identical with those indicated in detail in Fig. 1; and, in addition, there is inserted in the network between the resistor 43 and the conductor 41 a further temperature sensitive resistor 75, which is thermally associated with the resistor 15 in the thermal structure 11. Since the resistors 75 and 15 are both connected to the conductor 41, it will be obvious that they could be combined in a single resistance unit, the conductor 41 being connected thereto at a suitably located tapped point. The action of the resistor 75 is such that, as the temperature of the thermal element 11 varies with ambient temperature, or with heat transferred from the thermal element 12, the bridge balance will be disturbed in the same manner as though the temperature of the thermal element 12 had been subjected to a similar change with respect to the thermal element 11. For example, it may be assumed that, due to some uncontrollable cause, the temperature of the structure as a whole has increased. Without the compensating effect of the resistor 75, and with a positive value of the coefficient B, this increase in over-all temperature would tend to increase the electromotive force developed by the thermocouple groups 14 and 22, without respect to the temperature gradient existing between said groups. Assuming all temperature sensitive resistors in the system to have similar coefficients of resistivity, the increase in temperature of the resistor 75 will affect the balance of the bridge network in a manner similar to an increase of temperature of the resistor 23 with respect to that of the resistor 15, which would be the same effect as would result from too high a value of current in the heating element. The unbalance electromotive force in the bridge circuit, appearing between the conductor 40 and the tap 46, would be of the same nature as though said heater current had attained an excessive value; and, according to principles hereinbefore fully set forth, said electromotive force acting through the unit 55 would tend to modify the control grid potential of the triode 32 to lessen the flow of said heater current, and thereby to reduce the temperature difference between the thermal elements 12 and 11. By properly selecting the characteristics of the compensating resistor 75, the reduction of temperature difference in the thermocouple circuit may be made such as to offset with a high degree of precision the tendency for an elevation of over-all temperature to develop an increased electromotive force in a thermoelectric conbination having a positive value for the coefficient B. Likewise, it will be apparent that in the event of an uncontrollable reduction in the over-all operating temperature of the thermoelectric combination, the compensation provided by the auxiliary resistance element 75 will tend to bring about an increase in temperature difference between the elements 11 and 12, and thus compensate for the tendency of the thermoelectromotive force of the system to be lowered.

Figure 3:
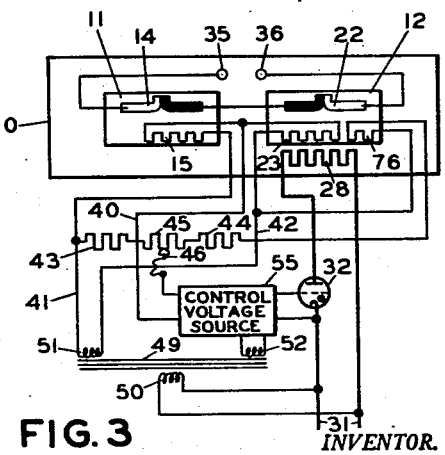

In Fig. 3 is shown a combination whereby compensation may be obtained for changes in overall temperature of a thermocouple combination in which the coefficient B has a negative value. It will be seen that the structure and the network will in all respects be identical to those shown diagrammatically in Fig. 2 with exception of the fact that the compensating resistor 75 in Fig. 2 is replaced by a similar compensating resistor 76 shown in Fig. 3 as inserted between the conductor 42 and the resistor 44. The general operating principle and performance of the compensating device shown in Fig. 3 are the same as those described in connection with Fig. 2, but in an opposite sense, to the extent that an increase in over-all temperature of the thermal structures will tend to effect an increase in the generated thermoelectromotive force, and thus compensate for the normal effect of the coefficient B having a negative characteristic.

It will be apparent that the reversal in compensating characteristic obtained by transposition of the auxiliary resistor, as between the forms shown in Figs. 2 and 3 respectively, may also be obtained by the substitution, in either of the forms shown, of an auxiliary resistor having a selected temperature coefficient of resistivity opposite in sign to that of the temperature-sensitive resistors 15 and 23 incorporated in the basic bridge network.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive electrical elements thermally associated with said bodies, means connecting said elements to combine their responses to temperature variations in said bodies and produce an electrical effect representative of the temperature difference therebetween, and controlling means subject to said effect to affect the electrical energization of said heating means.

2. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance elements thermally associated with said bodies and forming parts of an electrical network adapted to be balanced when a predetermined temperature difference exists between said resistance elements, and an electric controlling circuit responsive to the condition of balance characterizing said network and adapted to affect the electrical energization of said heating means.

3. Apparatus for deriving a substantially constant unidirectional potential from a commercial alternating current source, comprising a first body and a second body, electrical heating means thermally associated with only one of said bodies, and heat responsive electric potential producing means exposed to both of said bodies and interconnected to produce a unidirectional potential in accordance with difference of temperature of said bodies, electrical temperature-measuring means thermally associated with said bodies to produce an electrical effect independent of said potential but representative of said temperature difference, electrically actuated regulating means adapted to influence the electrical energization of said heating means, and electrical circuit means responsive to said electrical effect for controlling said regulating means in accordance therewith to maintain a predetermined temperature difference between said bodies.

4. Apparatus for deriving a substantially constant unidirectional potential from a commercial alternating current source, comprising a first body and a second body, electrical heating means thermally associated with only one of said bodies, and heat responsive electrical potential producing means exposed to both of said bodies and interconnected to produce a unidirectional potential in accordance with difference of temperature of said bodies, electrical temperature-measuring means thermally associated with said bodies to produce an electrical effect independent of said potential but representative of said temperature difference, and an electric controlling circuit responsive to said electrical effect and adapted to modify the energization of said heating means.

5. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance elements thermally associated with said bodies and forming parts of an electrical network adapted to be balanced when a predetermined temperature difference exists between said resistance elements, a further temperature-sensitive resistance element associated with the second of said bodies and included in said network to modify the balance condition of the same in accordance with changes in the actual temperature of said second body, and an electric controlling circuit responsive to the condition of balance characterizing said network and adapted to affect the energization of said heating means.

6. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance element thermally associated with said bodies and forming parts of an electrical network adapted to be balanced when a predetermined temperature difference exists between said resistance elements, a further temperature-sensitive resistance element associated with the first of said bodies and included in said network to modify the balance condition of the same in accordance with changes in the actual temperature of said first body, and an electric controlling circuit responsive to the condition of balance characterizing said network and adapted to affect the energization of said heating means.

7. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance elements thermally associated with said bodies and forming parts of an electrical network adapted to be balanced when a predetermined temperature difference exists between said resistance elements, a further temperature-sensitive resistance element associated with one of said bodies and included in said network to modify the balance condition of the same in accordance with changes in the actual temperature of said one body, and an electric controlling circuit responsive to the condition of balance characterizing said network and adapted to affect the energization of said heating means.

8. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance elements thermally associated with said bodies and forming part of an electrical network adapted to be balanced when a predetermined temperature difference exists between said resistance elements, an electronic control device having a cathode and an anode in circuit with said electrical heating means and a control electrode adapted to control the flow of current therein in response to the phase position of an applied alternating potential, together with means for varying the phase position of said applied potential in accordance with the balance condition of said network.

9. Apparatus for deriving a substantially constant unidirectional potential from a commercial alternating current source, comprising a first body, a second body located in heat transfer relation to said first body, electrical heating means thermally associated with said second body, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive electrical elements thermally associated with said bodies, means connecting said elements to combine their responses to temperature variations in said bodies and produce an electrical effect representative of the temperature difference therebetween, and controlling means subject to said effect to affect the electrical energization of said heating means.

10. Apparatus for deriving a substantially constant unidirectional potential from a commercial alternating current source, comprising a first body, a second body positioned adjacent said first body for transferring heat thereto by radiation and connection, electrical heating means thermally associated with said second body, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive electrical elements thermally associated with said bodies, means connecting said elements to combine their responses to temperature variations in said bodies and produce an electrical effect representative of the temperature difference therebetween, and controlling means subject to said effect to affect the electrical energization of said heating means.

11. Apparatus for deriving a substantially constant unidirectional potential from a commercial alternating current source, comprising a base plate of heat conducting material, a first body mounted on said base connected thereto by heat conducting material, a second body mounted on said base and thermally insulated therefrom, said second body being positioned adjacent said first body for transferring heat thereto otherwise than by conduction, electrical heating means thermally associated with said second body, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive electrical elements thermally associated with said bodies, means connecting said elements to combine their responses to temperature variations in said bodies and produce an electrical effect representative of the temperature difference therebetween, and controlling means subject to said effect to affect the electrical energization of said heating means.

12. Apparatus for deriving a substantially constant unidirectional potential from a commercial alternating current source, comprising a tubular member of heat conducting material, a plurality of thermo-junctions positioned interiorly thereof and electrically insulated therefrom, a resistor surrounding the exterior surface of said tubular member and electrically insulated therefrom, a second tubular member of heat conducting material surrounding said resistor and the first mentioned tubular member, a third tubular member of heat conducting material, a plurality of thermo-junctions positioned within said third tubular member and electrically insulated therefrom, a resistor surrounding the exterior surface of said third tubular member and electrically insulated therefrom, a fourth tubular member of heat conducting material surrounding said resistor and said third tubular member, means interconnecting the thermo-junctions of said first and third tubular members and connected to terminals for producing therebetween a unidirectional potential corresponding to the temperature difference between said first and third tubular members, electrical heating means thermally associated with said fourth tubular member, an electrical network including said resistors for producing an electrical effect dependent upon the difference between the temperatures at said resistors, and controlling means subject to said effect to affect the electrical energization of said heating means.

13. Apparatus for deriving a substantially constant unidirectional potential from a commercial alternating source, comprising a tubular member of heat conducting material, a plurality of thermo-junctions positioned interiorly thereof and electrically insulated therefrom, a resistor surrounding the exterior surface of said tubular member and electrically insulated therefrom, a second tubular member of conducting material surrounding said resistor and the first mentioned tubular member, a third tubular member of heat conducting material, a plurality of thermo-junctions positioned within said third tubular member and electrically insulated therefrom, a resistor surrounding the exterior surface of said third tubular member and electrically insulated therefrom, a fourth tubular member of heat conducting material surrounding said resistor and said third tubular member, means interconnecting the thermo-junctions of said first and third tubular members and connected to terminals for producing therebetween a unidirectional potential corresponding to the temperature difference between said first and third tubular members, a base of heat conductive material, means connecting said first and second tubular members in heat conducting relation to each other and for connecting said members to said base in heat conducting relation thereto, and means connecting said third and fourth tubular members in heat conducting relation to each other, said third and fourth tubular members being mounted on said base and thermally insulated therefrom, electrical heating means thermally associated with said fourth tubular member, an electrical network including said resistors for producing an electrical effect dependent upon the difference between the temperatures at said resistors, and controlling means subject to said effect to affect the electrical energization of said heating means.

14. Apparatus for deriving a substantially constant unidirectional potential from a commercial alternating current source, comprising a first body and a second body, electrical heating means thermally associated with only one of said bodies, a thermoelectric generator comprising a plurality of interconnected thermocouples having junctions of one polarity thermally associated with said first body and junctions of the opposite polarity thermally associated with said second body, and terminals whereby to obtain the total electromotive force generated, temperature-sensitive resistance elements thermally associated with said bodies and forming part of an electrical network adapted to be balanced when a predetermined temperature difference exists between said resistance elements, an electronic control device having a cathode and an anode in circuit with said electrical heating means and a control electrode adapted to control the flow of current therein in response to the phase position of an applied alternating potential, means for applying to said control electrode an alternating potential of substantially constant value and substantially in quadrature with the potential of said anode, and means responsive to unbalance of said network for superimposing upon said quadrature potential a potential substantially in phase with said anode potential and varying with the extent of unbalance of said network.

FREDERICK L. MALTBY.

No references cited.